United States Patent [19]

Beerli et al.

[11] Patent Number: 5,107,574
[45] Date of Patent: Apr. 28, 1992

[54] CONE SECTION WARPING MACHINE AND METHOD OF WARPING

[75] Inventors: Markus Beerli, Gossau; Hans-Peter Zeller, Flawil, both of Switzerland

[73] Assignee: Benninger AG, Switzerland

[21] Appl. No.: 588,554

[22] Filed: Sep. 26, 1990

[30] Foreign Application Priority Data

Oct. 9, 1989 [CH] Switzerland ............ 3680/89

[51] Int. Cl.$^5$ .................. D02H 13/34; B65H 54/12
[52] U.S. Cl. ........................... 28/191; 28/195
[58] Field of Search ............ 28/191, 196, 195

[56] References Cited

U.S. PATENT DOCUMENTS

| 2,557,597 | 6/1951 | Crouzet | 28/191 |
| 4,074,404 | 2/1978 | Schenk | 28/191 X |

FOREIGN PATENT DOCUMENTS

| 669408 | 12/1938 | Fed. Rep. of Germany . | |
| 1813495 | 6/1968 | Fed. Rep. of Germany . | |
| 2510517 | 9/1976 | Fed. Rep. of Germany . | |
| 2511954 | 9/1976 | Fed. Rep. of Germany | 28/191 |
| 3432276 | 4/1985 | Fed. Rep. of Germany | 28/191 |
| 3527424 | 2/1987 | Fed. Rep. of Germany | 28/191 |
| 3702293 | 9/1987 | Fed. Rep. of Germany | 28/191 |
| 812045 | 1/1988 | Fed. Rep. of Germany . | |
| 906516 | 1/1946 | France | 28/191 |
| 3196733 | 8/1988 | Japan | 28/191 |

*Primary Examiner*—Werner H. Schroeder
*Assistant Examiner*—John J. Calvert
*Attorney, Agent, or Firm*—Shoemaker and Mattare, Ltd.

[57] ABSTRACT

Separate drive motors (30, 35) for the positioning of the warping carriage (25) in the X-, respectively the Y-direction, are provided on a cone section warping machine. In addition to that, separate servo signals for both the servo motors (30, 35) are generated, whereby not only the absolute value of the servo signals but also their relationship to one another is stored and is able to be corrected through correction values. For the correction, a program control device (62) and/or a regulator (67), respectively correction circuits (64, 66), are provided.

15 Claims, 5 Drawing Sheets

CONE SECTION WARPING MACHINE AND METHOD OF WARPING

BACKGROUND OF THE INVENTION

This invention relates to a method and apparatus for winding yarn strips draw from a bobbon creel on a warping drum.

With section warping machines, such as those known from the applicant's DE-A1-38 12 045 and DE-PS-25 10 517, a warping reed, together with a deflection roll or a press roll, is arranged on a warping carriage. When warping, numerous yarns are led through the warping reed and onto the warping drum around the deflection roll or press roll, whereby yarns in the form of a strip are in each case wound on to form a winding. At the same time, the first strip is wound onto the cone of the warping drum with a parallelogram shaped cross section. As soon as the first strip is wound on, the next strip is laid on the drum immediately next to the fully wound strip and, likewise, subsequently immediately wound on with the appropriate yarn length and parallelogram shaped cross sections. This procedure is repeated correspondingly with the strips which follow, until the entire yran warp has been wound onto the warping drum. For the winding procedure of each strip, the warping carriage must first of all be brought to a start position, from which it is continuously moved with regard to the growth of the strip and the inclination of the cone, in order to make the parallelogram shaped build-up possible. At the same time the press roll is pulled back with the increasing winding thickness, in order to keep the pressing force as constant as possible. In the case of known section warping machines of this type, a common drive for the warping carriage and the feed of the press roll is therefore provided, with which, out of necessity, the relationship between lateral carriage movement and feed of the press roll is mechanically determined. It is also known with such section warping machines that a reference winding is first of all produced on the warping drum, that the thickness of the reference winding, dependent on the number of rotations of the warping drum, is determined and accordingly the common feed of the warping carriage and press roll dependent on these measured values, is corrected. This kind of correction, however, only causes the enlargement or diminishment of both feed values (parallel and radial to the warping drum) without the angle arising from the simultaneous movement in the X- or Y-directions changing itself as a result. If, however, the direction of the warping carriage travel does not correspond exactly with the angle of the cone, the strips will not be uniformly wound. In practice, those problems are hardly avoidable, for reasons of tolerances in fabrication of the cone of the warping drum and of the drive mechanisms of the warping carriage and the press roll alone. In addition, the necessity of manufacturing the cone of the warping drum as exactly as possible arises from this, entailing a complicated construction and fabrication procedure.

It is the purpose of the invention to avoid these known disadvantages, and thus to create in particular a cone section warping machine and a method of warping which makes an exact and angularly true guide of the strip possible. In addition, the fabrication effort, in particular for the manufacture of the drum cone, should be made easier and the application of drums with varying cones—whether a result of fabrication tolerances or replacement—should be made possible. According to the invention this is achieved with a cone section warping machine having independent motors for the reed and the deflection roll.

SUMMARY OF THE INVENTION

Through separation of the drive into a drive acting parallel to the warping drum (in the X-direction) and a drive acting radially to the warping drum (in the Y-direction), each with a separate drive motor, each desired movement of the warping reed and/or the deflection or press roll can be undertaken. Normally the press roll, as with warping machines known till now, is at the same time arrranged on a warping carriage. The warping carriage carries, according to the invention, the separate drive motor. Naturally it is also conceivable to place the press roll and warping reed separately (for example on two different carriages). The pressing force of the deflection roll or the press roll is determined according to the type of use, and also in particular according to the yarns to be wound on. Naturally numerous press rolls, or one deflection roll and one or more press rolls, can be provided.

Through the use of two separate drive motors the feed duration and feed speed in the X- and in the Y directions can be separately controlled or regulated, whereby also the drive relationship of both the drive motors and with that the resulting angled movement of the warping carriage can be controlled or regulated. The feed of the warping carriage and/or the press roll can at the same time, for example, be pre-programmed in a program control device and called up from storage. This kind of control device, as is known, for example, in machine tool construction, permits the adjustment of the feed in the X-and Y-directions in such an exact way that the press roll and warping carriage can reliably follow the contour of the drum cone. this can be achieved both with digital and analogue controls. The change of the relationship X:Y is also able to be realized with known control devices without problems, through which the X-Y deflection of the warping carriage can subsequently be adjusted to an existing angle of the cone. The cone itself can thus be fabricated with essentially less precision and replacement can ensue without the need for lengthy adjustment and interference with the drives, In place of program control (or in addition to program control), a genuine regulation of the feed of both the drive motors can also be undertaken. As a regulating variable, the distance of the warping carriage from the cone and/or from the preceding strip winding can at the same time be sensed, for example by means of a distance feeler. It would also be conceivable, for example according to DE-GM-18 13 495, to control or regulate the warping carriage displacement by means of a light beam with reflector strip. The effective growth of the strip winding can also be monitored, dependent on the rotations of the warping drum, for the correction of the preset control values and/or as primary feedback variables for the regulation, and used for the formation of a feedback variable or a value for the control deviation.

A servo system can be employed with advantage for the drive in the X- and Y-directions, in which the motor is driven and the respective rotational movement is monitored by a tachometer and reported back, Step motors are especially suitable as drive motors, in particular in connection with digital regulators or controls.

According to the type of use, other types of drive motors, for example hydraulic or pneumatic motors, can be employed with advantage.

In particular with arrangements having multi-feedback of command variable of distrubance variables and with programmable and correctable feed values, it is advantageious if an electronic computer is provided for carrying out the comparison, correction and/or regulation functions. At the same time the computer also can be connected to a measuring arrangment for measurement of the thickness growth of the reference winding and can carry out a comparison with a preset nominal value for the thickness growth, so that deviations are registered and employed for the generation of corrections signals.

At the same time, the computer can naturally be so designated that other functions of the warping machine can be monitored simultaneously, for example the rotation values and the strip winding growth can be used for calculation of the stip length, or switch-off or alarm functions can be provided for certain operating condition. At the same time, the program control function of the computer can provide for the automatic return of the warping carriage and/or automatic travel of the warping carriage to the start point in order to start a new strip.

BRIEF DESCRIPTION OF THE DRAWINGS

The invention is more closely explained with aid of the drawings, wherein.

DESCRIPTION OF THE PREFERRED EMBODIMENT

Figure 1:
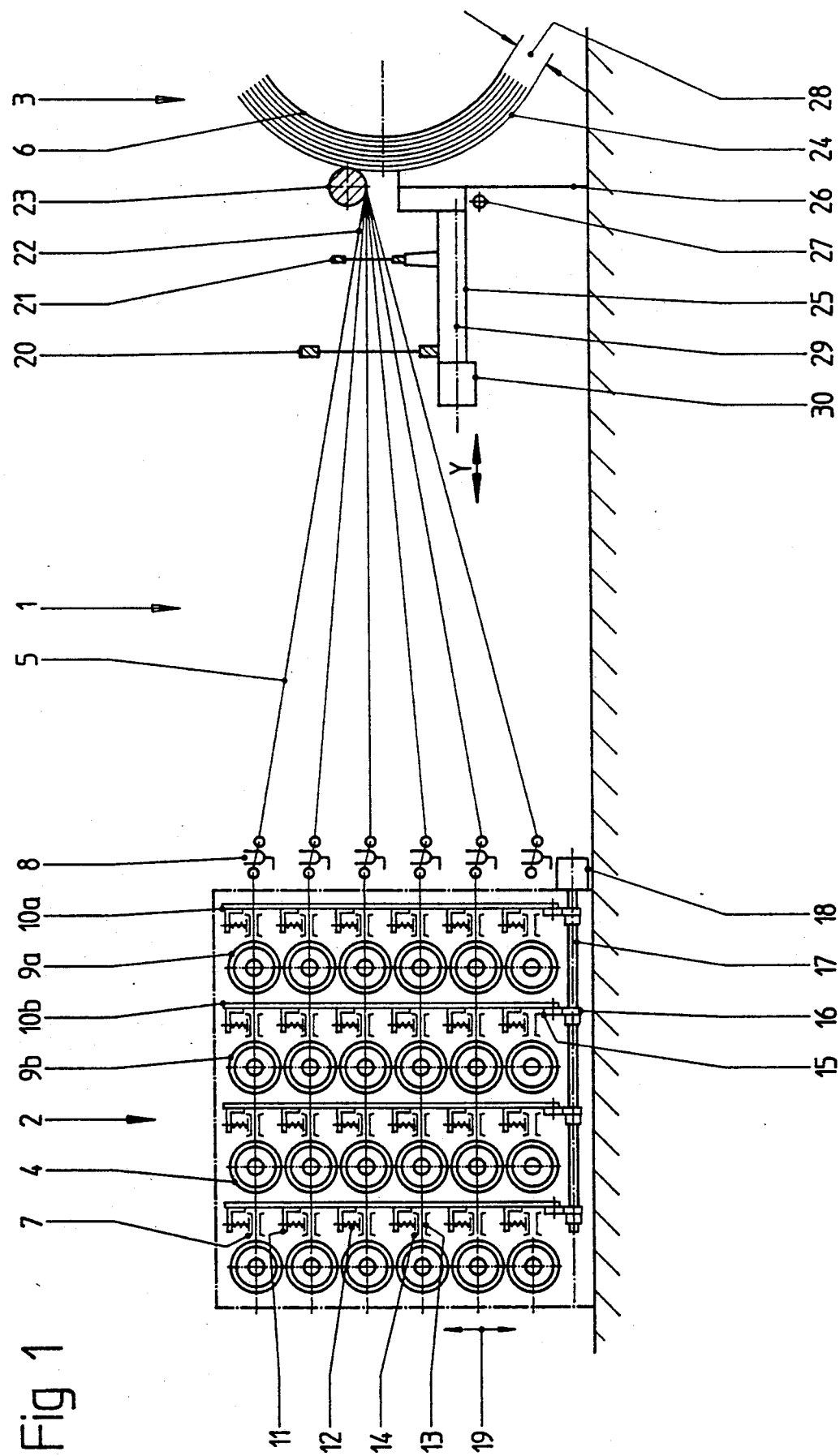
FIG. 1 is a diagrammatic view of a warping plant with the features of the invention in profile.

As shown in FIG. 1, a warping plant 1 exhibits a bobbin creel 2 and a section warping machine 3. Numerous bobbins 4 are mounted on the bobbon creel 2, from which yarns 5 are drawn and wound onto a warping drum 6 to form a strip 28. The yarns 5 are led over a yarn tensioner 7 to create a definite yarn tension and a yarn monitor 8 to monitor yarn breakage. Matching yarn tensioners are intergrated for each vertical row of bobbins 9a, 9b etc and are able to be deflected through vertical braking rods 10a, 10b etc. Each yarn tensioner 7 exhibits an angle 11, a pressure spring 12 and an upper, respectively a lower braking disk 14, respectively 13. The braking rods 10a, 10b etc are provided with a roller 15 on the lower end, for deflection in the vertical direction and for actuation of the braking disk, which is connected through an eccentric with a horizontal shaft 17. Through rotation of the servo motor 18 the eccentrics 16 are rotatable, whereby the braking rods 10 are displaced either upwards or downwards and through that the braking disks 14 can be either more strongly or less strongly pressed against the lower braking disks 13 in order to increase or decrease the yarn tension.

Figure 2:
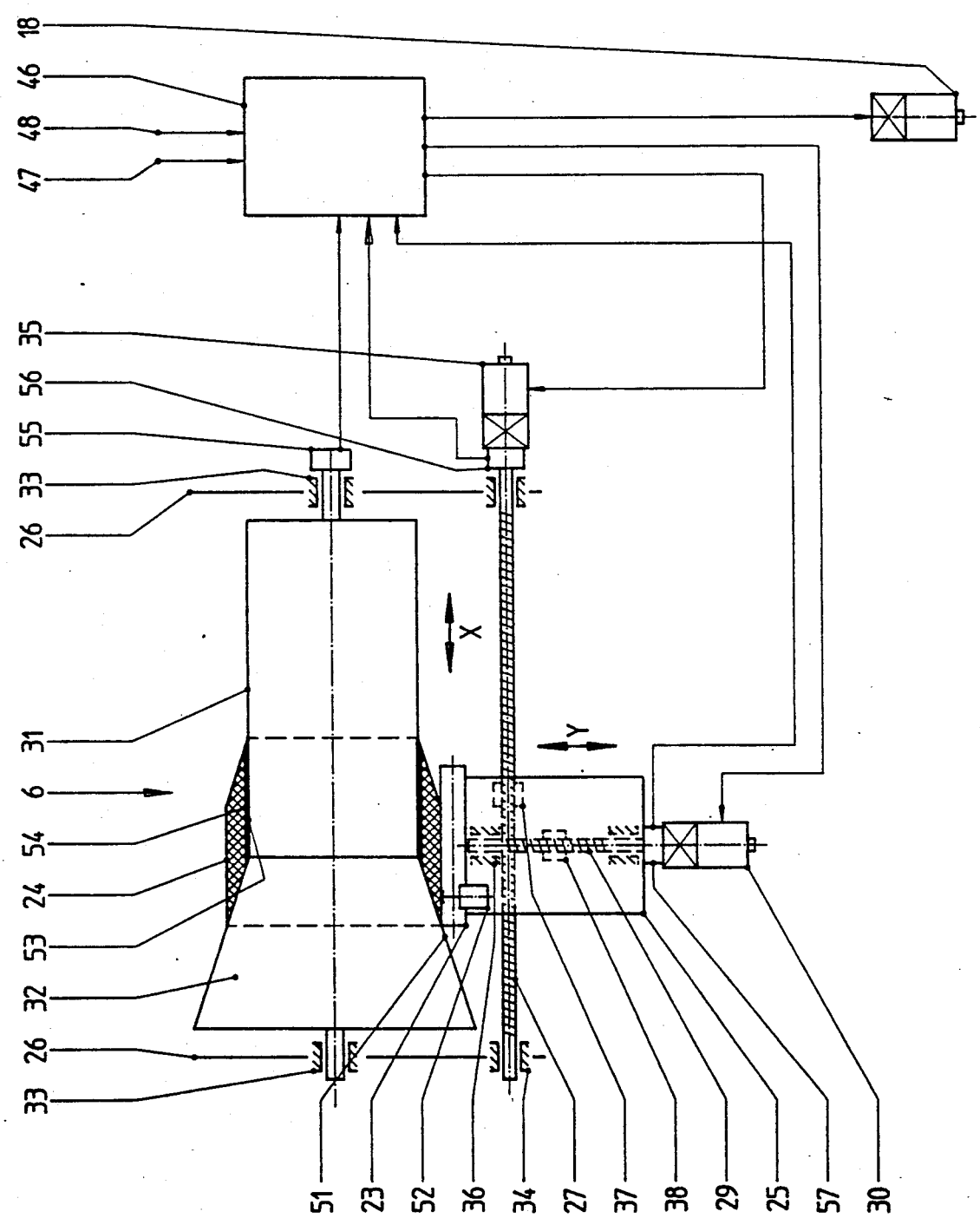
FIG. 2 is a diagrammatic view of a drive element for the waping carriage in an enlarged scale.

The yarns, drawn from the bobbin creel 2, pass a cross reed 20 in front of the warping drum 6, in which the numerous yarns 5 acquire the desired yarn order. Subsequently, the yarns 5 are led through the warping reed 21 and at the same time are brought together to form a yarn strip 22 which is then led over a deflection roll or a press roll 23 and wound onto the warping drum 6 in the form of a strip 24. The cross reed 20, the warping reed 21 and the press roll 23 are fixed onto a warping carriage 25, which is placed on a machine frame 26 which is not shown in any greater detail here, and is able to be moved by a longitudinal spindle 27 parallel to the warping drum 6, that means in the X-direction (FIG.2). The warping carriage 25 is also —in relation to the warping drum 6—able to be displaced radially, that means in the Y-direction. For this purpose it is moveable by means of a motor 30 driving a right angles spindle, as suggested in the diagram.

According to the depiction in FIG. 2, the warping drum 6, with its cylindrical part 31 and its cone part 32 is mounted to rotate in schematically represented bearings 33 in the machine frame 26 and driven by drive elements which are not shown in greater detail.

The longitudinal spindle 27 is mounted in the bearings 34 and driven by a drive motor 35 in such a way that the warping carriage 25 travels parallel to the axis of the warping drum 6 through a spindle nut 37 in a known way.

A press roll 23 is fixed to the warping carraige 25 in a known way so that with a rotation of the rightangled spindle 29 in its bearings 36 a feed of the warping carriage in the Y-direction is caused through the spindle nut 38.

A push-button element 52 is mounted on the warping carraige 25 which, according to CH-PS-669 408, permits measurement of the thickness of a reference winding 54. Simultaneously, the number of rotations of the warpoing drum 6 is ascertained by means of a rotation counter 55, so that the thickness growth per rotation can be established in a computer 46 (The output of the push-button element 52 is likewise connected to the input of the computer 46, which is not shown for reasons of clarity). Nominal values for the drive control of both the drive motors 30, 35 om X- and Y-directions are stored in the computer 46. These values can, for example, be checked during or after the creation of the reference winding and a correction of the servo signals transmitted to the drive motors 30, 35 can ensue, in so far as, at the same time, a deviation of the actual value per rotation from the nominal value per rotation arises. At the same time, the drive motors 30 and 35 are in each case a part of the servo drive system which contains the measuring transmitters 56 and 57, which report back the actual position of the rightangled spindle 29 and the longitudinal spindle 27 to the computer.

Figure 3:
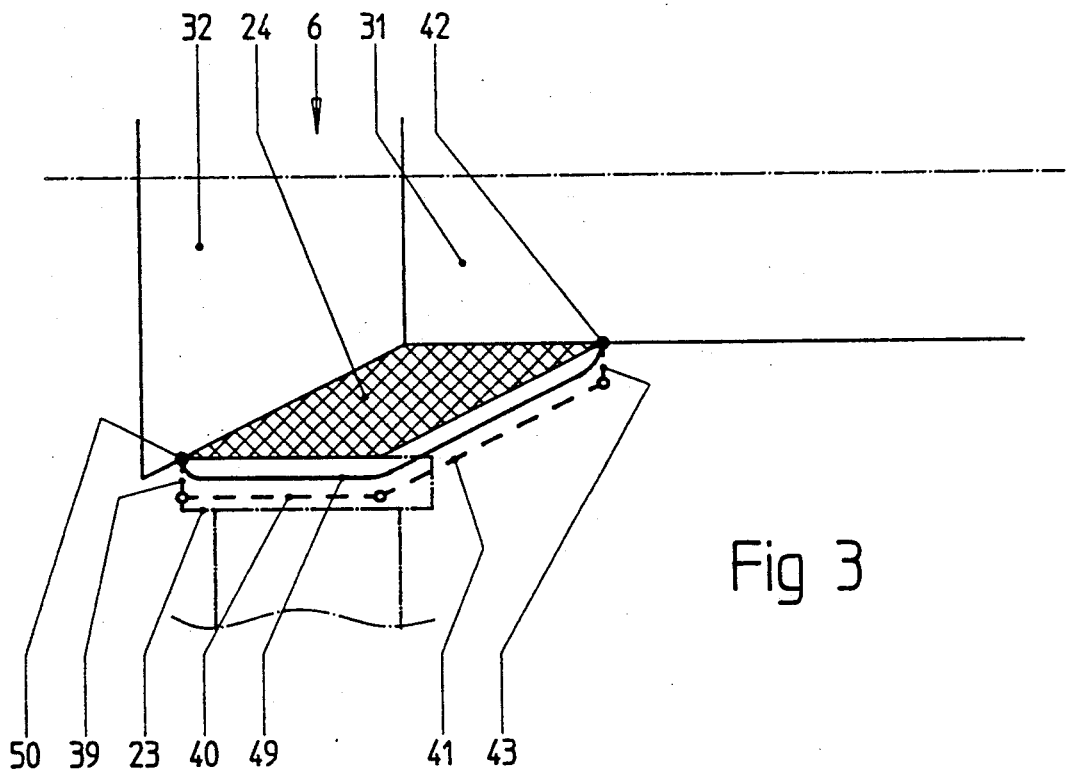
FIG. 3 depicts the feed travel of the warping carriage from a completely wound strip to a new start point.
Figure 4:
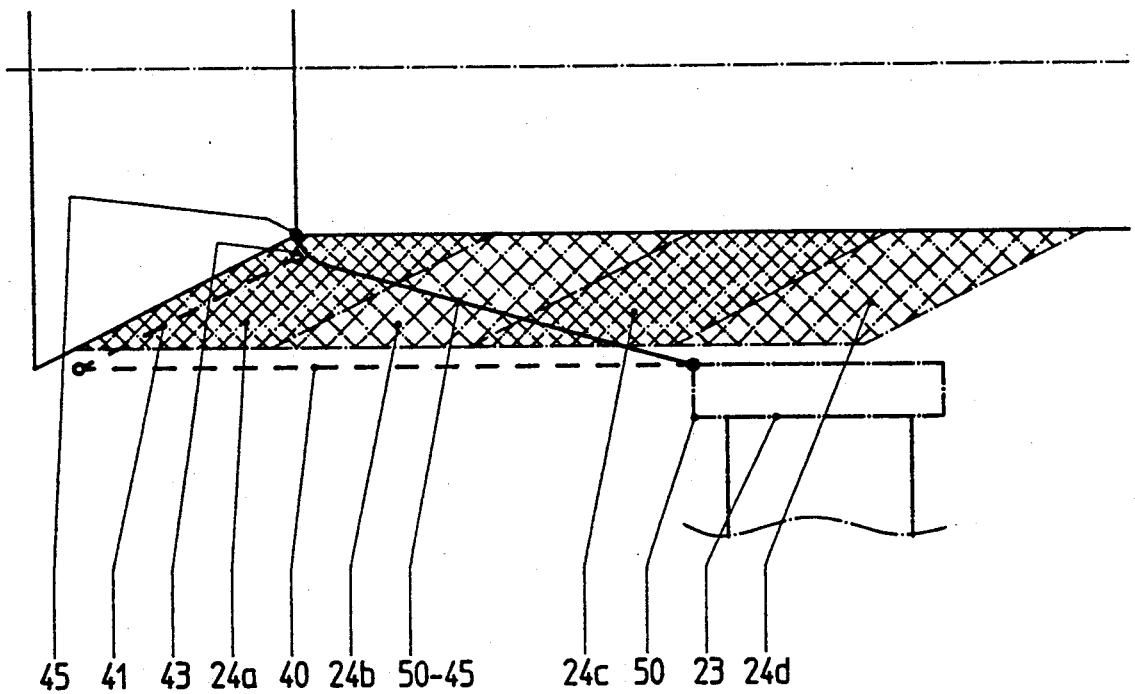
FIG. 4 shows the displacement of the warping carriage from the end position after warping, back to the cone start point.

Through the separated drive control in the X-, respectively the Y-direction, the travel of the warping carriage 25 and the press roll 23 can be controlled or regulated in such an exact way that the parallelogram shaped winding build-up, as can be observed in FIGS. 2 to 4, results, which follows the exact contour of the cone, respectively the line of the cone 51. In practical use, therefore, the warping drum 6 can, for example, be fitted with a flatter or a steeper cone 32—o for example for cotton with a steeper cone as opposed to a flatter cone 32 for synthetic yarns—in order to avoid slippage of the yarns 5 when winding on. In each case the individual drive in the X- and in the Y-direction permits adjustment to any required cone angle, whereby also fabrication tolerances can be cancelled out by interference with the control procedure and/or through a regulation in such a way that the strip winding 24 always follows the line of the cone exactly.

In FIGS. 3 and 4, a further advantageous possibility for use of the invention is able to be observed: In FIG. 3 is is shown how the warping carriage with the press roll 23 is, with known arrangements. newly positioned after winding on of a strip 24. First of all, with known warping machines, the drive mechanism for the travel in the X-direction must be disengaged in order that the warping carriage together with the press roll 23 can be lifted off the strip 24 along the line 39. Then the drive mechanism for travel in the Y-direction must be disengaged in order to move the warping carriage to the right along the line 40, parallel to the winding. After that, both drive mechanisms can be re-engaged in order to move the carriage, inclined and parallel to the cone of the strip winding 24, along the line 41. In the final sequence, the drive mechanism for the X-direction must be once again disengaged in order that the press roll can be positioned along the line 43. Since the exact positioning in relation to the new start point of the strip 42 is of great significance, positioning procedures which are carried out manually are extraordinarily lengthy and demanding, and this can lead to start errors.

As opposed to this, the separated drive of both the drive motors for the X-direction and the Y-direction permits, with the invention, an absolutely exact positioning of the warping carriage at each start point. Dependent on the strip width, the movement sequence in the X-direction or the Y-direction can be either electronically programmed or, however, regulated through, for example, the application of a feeler, for example a distance feeler or a travel measurement device, or also an optoelectronic scanner system according to DE-GM-18 13 495. At the same time the drive devices must no longer be disengaged since the drives can be separately controlled and consequently every desired movement resulting from movement in the X-direction or the Y-direction can be achieved. At the same time the carriage follows the direct line of movement 49 from the finish pint 50 to the new start point 42, according to FIG. 3. With that the cone section warping machine, according to the invention, operates not only more rapidly, but it is able to produce warps of better quality.

This direct positioning possibility can mainly be used to advantage when returning the warping carriage out of its finish position 50 to the cone start point 45. FIG. 4 shows how the press roll, at the end of a warping procedure after the strips 24a and 24d have been wound on, must be returned to the cone start point 45 for a new winding procedure. In the case of conventional plant, the warping carriage had to be moved along the line 40 (FIG.3), firstly horizontally (Drive mechanism for the Y-drive disengaged) and then moved along line 41. In the case of the arrangement according to the invention, however, the warping carriage can be positioned directly along the line 50–45. At the same time, any desired correction factors or movement control commands can be entered through an input 47 to the computer 46, as is shown in FIG. 2. Such correction factors, which are manually entered or are detected by the corresponding feelers, concern in particular the angle of the cone of the warping drum 6 as well as absolutely any fabrication tolerances of the angle of the cone and the diameter of the warping drum 6. With the use of a computer 46 these correction factors can be advantageously realized through software. As is schematically shown, process data can in addition be entered through a second input 48, for example:

Yarn quality
Number of yarns, respectively strip width
nominal warp length
Yarn tension.

The computer 46 can ascertain a start feed from this data and calculate or correct the corresponding nominal movement sequence for the drive motors 35 and 30 in the X- and Y-directions.

Since the yarn tension has an appreciable influence on the increase in thickness of the strip winding 24, and with that indirectly influences the movement sequence of the warping carriage in the Y-direction, regulation of the yarn tension by means of the computer 46 is additionally provided, according to the invention. In addition, the yarn tension is continuously monitored by known yarn tension measuring equipment, (for example strip tension regulators), which is not shown here, the ascertained measured values are transmitted to the computer 46 and from here servo signals are sent back to the servo motor 18, (FIG. 1 and FIG. 2). As previously described, the servo motor 18 adjusts the upper braking disks 14 in the bobbin creel 2 through a shaft 17, eccentrics 16 and braking rods 10, so that in this way a constant re-regulation of the yarn tension to a nominal value is possible. In combination with the program control or regulation of the warping carriage drive in X- or the Y-direction, an exact and high quality winding build-up is ensured in a particularly advantageous way as a result.

Figure 5:
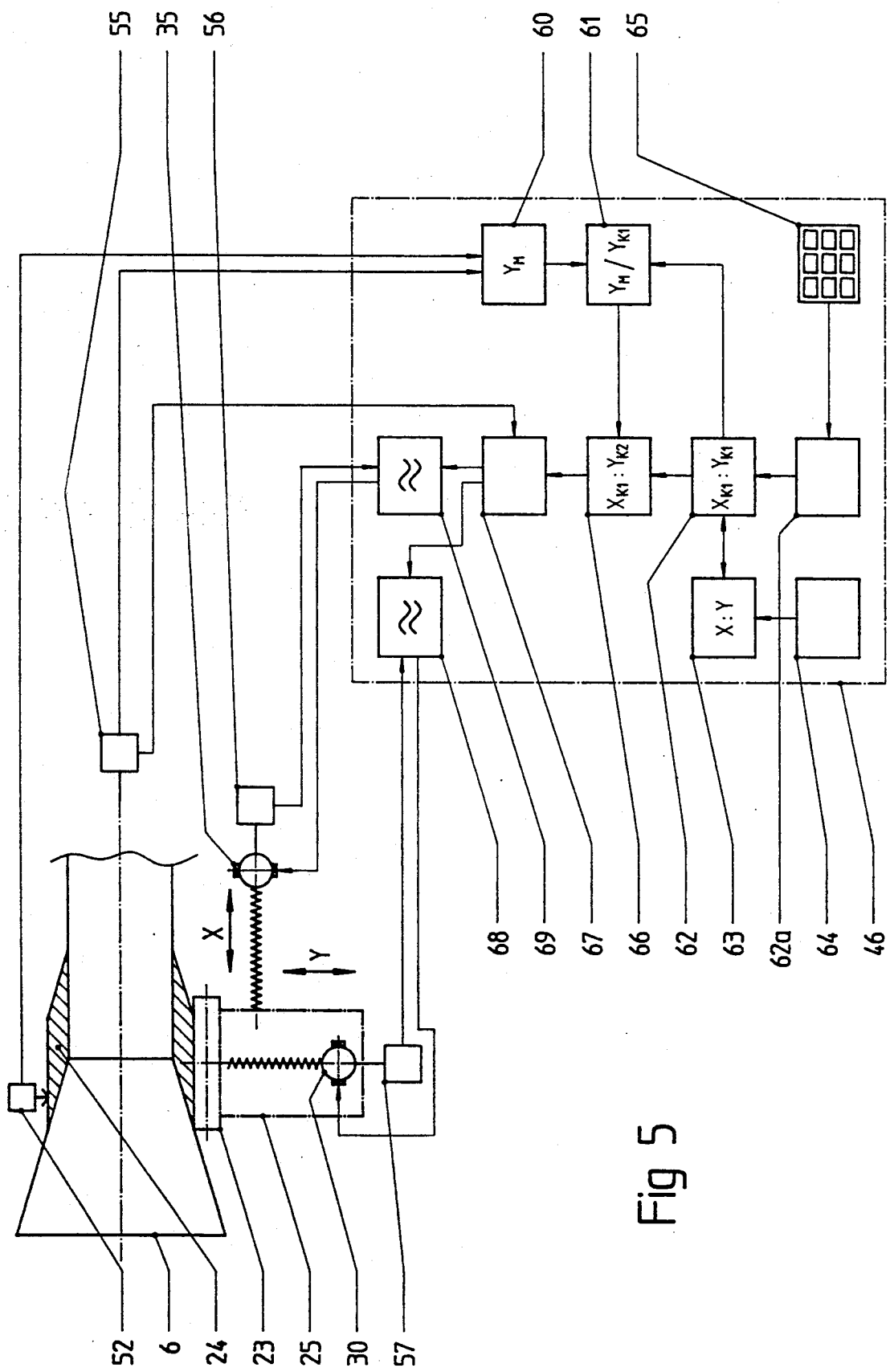
FIG. 5 is a function diagram of a warping carriage electronic drive control with the features of the invention and FIG. 6 is a modified function diagram.

FIG. 5 shows schematically the function, according to the invention, of the regulation and control of the drive motors 30, 35 by the computer 46 according to FIG. 2. At the same time, only the functional sequences which are essential to the invention are shown, whereby functions preset through hardware and functions controlled by software are not differentiated. In this way, for example, the memory can be realised as a freely addressable store of a computer or as a special PROM's, without that this having an influence on the functions according to the invention. Nominal values, too, can be either preset with software or, for example, stored in ROM's.

The same parts appearing in FIGS. 2, 4 and 5 bear the same labelling throughout. As is shown in FIG. 5, the thickness of the strip winding 24 is measured with a feeler which is formed as a push-button element 52. Simultaneously the number of rotations of the warping drum 6 is measured with a rotation counter 55 so that the thickness growth of the winding, and with that the value YM for the carriage feed in the Y-direction, can be ascertained in a logical circuit 60. The respective actual value for YM is fed to one of the inputs of a comparator 61, to whose other input a correction value YK1 for the feed in the Y-direction is fed. The correction value YK1 is generated in a program control device 62. At the same time the basic nominal values for the feed in the X- and the Y-direction are fed to an input of the program control device 62. These basic nominal values are stored in a memory 63 which, for example, can be altered by the manufacturer through a correcting circuit 64 in order to undertake an adjustment to, for example, different angles of the cone/cone tolerances. The program control device 62 is provided with a logical circuit 62a into which data can be entered by means of a keyboard 65. By this means the user can, for example, enter certain corrections, for example, when changing the cone or changing the entire warping drum 6. The input can, at the same time, ensue directly into the program control device. Alternatively, a modification can also be undertaken in the memory 63 by means of software through the program control device 62, or through the correction circuit 64. Alternatively, for example, corrections can naturally be also undertaken in the memory 63, for example by replacing ROM's or PROM's. With that, correction feed values XK1:YK1 are generated through the program control device 62 with the logical circuit 62a which, as already described, are fed to the comparator 61 and in addition are fed into a second correction circuit 66. Based on the primary feedback variable Delta Y from the comparator 61, the feed value YK1 is corrected in the correction circuit 66, in so far that a deviation arises. Naturally it is also possible to correct not only the Y-value but also the X-feed value, in so far as this is necessary. The correction values XK1 and YK2 are fed from the second correction circuit 66 to the input of the regulator 67, to whose other input are fed feedback signals from the rotation counter 55. The regulator 67 now generates servo signals for the drive motors 30, 35 in the drive ratio XK1:YK1, which is preset by the second correction circuit 66. Through the feed back of the rotation signals from the rotation counter 55, it is at the same time ensured that, in the case of oscillations in the number of rotations of the warping drum 6, the feed values X and Y for both the motors 30 and 35 can be proportionally adjusted. The regulator 67 controls the output of current supply devices 68, 69, one for each of the drive motors 30, 35. Each drive motor 30, respectively 35, with the corresponding current supply device 68, 69, in conjunction with the tachometers, respectively rotation measurement transmitters 56, 57, forms a servo drive. That means that the current supply device 68, 69 in each case controls the drive of the motor 30, respectively 35, until the values fed back from the measurement transmitters 57, 56 correspond with the nominal values released from the regulator 67.

The feedback of the thickness growth value per rotation of the warping drum 6 by means of the push-button element 52 can, for example, during the warping process be carried out only once according to the preceding description of the production of a reference winding. The correction of the Y-nominal value ensues then only once, and after carrying out the correction, the deflection of the warping carriage 25 is controlled and not regulated in an actual sense. The program control device 62 is also provided with standard nominal values for automatic return of the warping carriage (FIG. 4) and for automatic movement to a new strip start point (FIG. 3).

Figure 6:
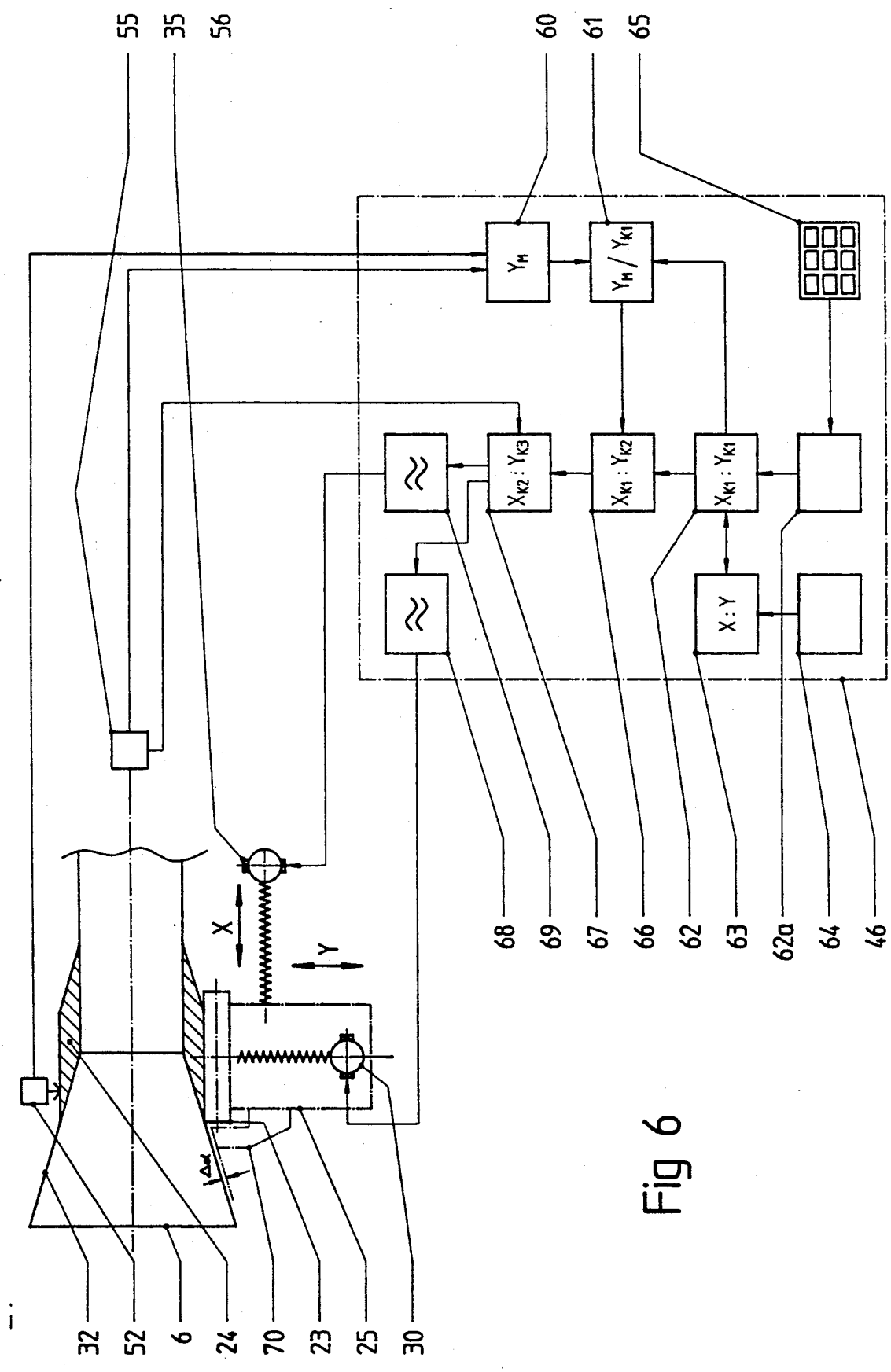

In the embodiment according to FIG. 6 an arrangement is, however, shown with which continuous regulation is possible. Differing from FIG. 5, the warping carriage 25 is at the same time arranged with a distance feeler 70, with which the distance Delta α from the cone 32 of the warping drum 6 is continuously measured. A commercially available, proximity capacitance feeler can be employed as a distance feeler. Naturally the use of inductive optoelectronic or mechanical feelers is possible. The value Delta α is reported back from the feeler 70 to the regulator 67 where the nominal distance value is stored. In the operating sequence, the feed of the warping carriage 25 is first of all undertaken in X-, respectively the Y-direction, on the basis of the signals released from the program control device 62. These signals also determine the relationship of the feed in the X-, respectively the Y-direction. As soon as, however, the distance Delta α becomes less than a minimum value during the operating sequence, the drive speed of the motor 30 and/or the motor 18 and the motor 35 is increased, until the preset nominal value in the regulator 67 is reached. In this way the position of the warping carriage 25, and with that also the pressing force of the press roll 23, can be very exactly adjusted. Naturally, the measured values fed back from the feeler 70 can be used both for a continuous regulation during the entire warping procedure, as well as only for a correction of the nominal values during the production of a reference winding, with subsequent program control on the basis of the corrected values.

The invention thus makes possible the creation of high quality warps in an optimally simple way, and the automatic compensation of fabrication tolerances, in particular of the warping drum, as well as a simplification of the operating sequence.

We claim:

1. A cone section warping machine for winding yarns drawn off a bobbin creel onto a rotating warping drum, comprising a warping reed laterally slidable in an X-direction parallel to the warping drum, for bringing yarns from the creel together to form a yarn strip, a deflection roll movable in a Y-direction toward and away from the warping drum, for pressing the yarn strip against the warping drum as the strip is wound onto the warping drum, an X-feed device for moving the warping reed in the X-direction, to traverse the thread strip during winding, a Y-feed device for moving the deflection roll in the Y-direction, the X-feed device including a first motor operating at an X-feed rate, the Y-feed device including a second motor operating at a Y-feed rate and operative independently of the first motor, and controlling means for generating proportional actuation signals for each of the motors independently, causing a drive ratio X:Y of the X- and Y-feed rates in the X- and Y-directions to be varied during operation of the machine.

2. A cone section warping machine as recited in claim 1, wherein the controlling means comprises means for altering the drive ratio X:Y.

3. A cone section warping machine as recited in claim 1, wherein both said first and second drive motors are servomotors having transducers for indicating relative position of the deflection roll and the warping reed, respectively.

4. A cone section warping machine as recited in claim 1, wherein both of the first and second motors are impulse-controlled electric stepper motors.

5. A cone section warping machine as recited in claim 4, further comprising means for measuring yarn thickness increase rate on the drum per rotation of the warping drum, said measuring means being coordinated with the controlling means, and further comprising means for generating correction factors for altering the drive ratio X:Y, dependent on a measured increase in thickness.

6. A cone section warping machine as recited in claim 1, wherein the controlling means comprises an electronic computer.

7. A cone section warping machine as recited in claim 6, wherein the computer has a memory for storing a standard drive ratio X:Y and further comprising an input device for adjusting said standard ratio.

8. A cone section warping machine as recited in claim 6, wherein the computer is coordinated with the means for measuring the increase in winding thickness, and has a memory for storing a nominal thickness signal, and further comprising means for comparing the nominal thickness signal with actual thickness signals.

9. A cone section warping machine as recited in claim 6, wherein the computer comprises means for automatically changing at least one of said actuation signals dependent on a primary feedback variable, representative of a measured growth in thickness of the strip winding per rotation or a measured value or combination thereof, for the lateral distance of the warping reed or the press roll from the warping drum cone, respectively, from the preceding strip winding.

10. A cone section warping machine as recited in claim 1, wherein said controlling means is an electronic computer having a memory for storing the drive ratio X:Y, and means for automatically changing the X- and Y-feed signals sent to the motors, in response to position signals provided by said transducers.

11. A method of winding yarns in the form of strips onto a rotating warping drum, comprising steps of
drawing yarns off a bobbin creel and through a warping reed to form a yarn strip,
passing the yarn strip onto the rotating drum while pressing the strip against the warping drum with a pressure roll, thus creating a strip winding on the drum,
generating a reed control signal for reciprocating the warping reed in a first direction parallel to the drum to move the yarn strip across the drum as it is wound, and
generating a pressure roll control signal for moving the pressure roll in a direction away from the drum to control winding thickness of the yarn strip, while
regulating an interrelationship of said control signals by means of feedback signals to indicate positions of said reed and said pressure roll relative to said drum.

12. A method as recited in claim 11, wherein nominal values of servo signals are stored in a pre-programmable control device, and a relationship of the servo signals to each other and a nominal value is corrected continuously through correction values.

13. A method as recited in claim 11, wherein nominal values of servo signals are stored in a pre-programmable control device, and a relationship of the servo signals to each other and a nominal value is corrected cyclically through correction values.

14. A method as recited in claim 12 or claim 13, wherein the correction values are manually entered.

15. A method as recited in claim 11 or claim 13, wherein the correction values and the feedback signals are derived from signals representing one or more of: thickness growth of the strip winding on the warping drum, position of the warping reed relative to the warping drum, or the position of the pressure roll relative to the warping drum.

* * * * *